(No Model.) 3 Sheets—Sheet 2.

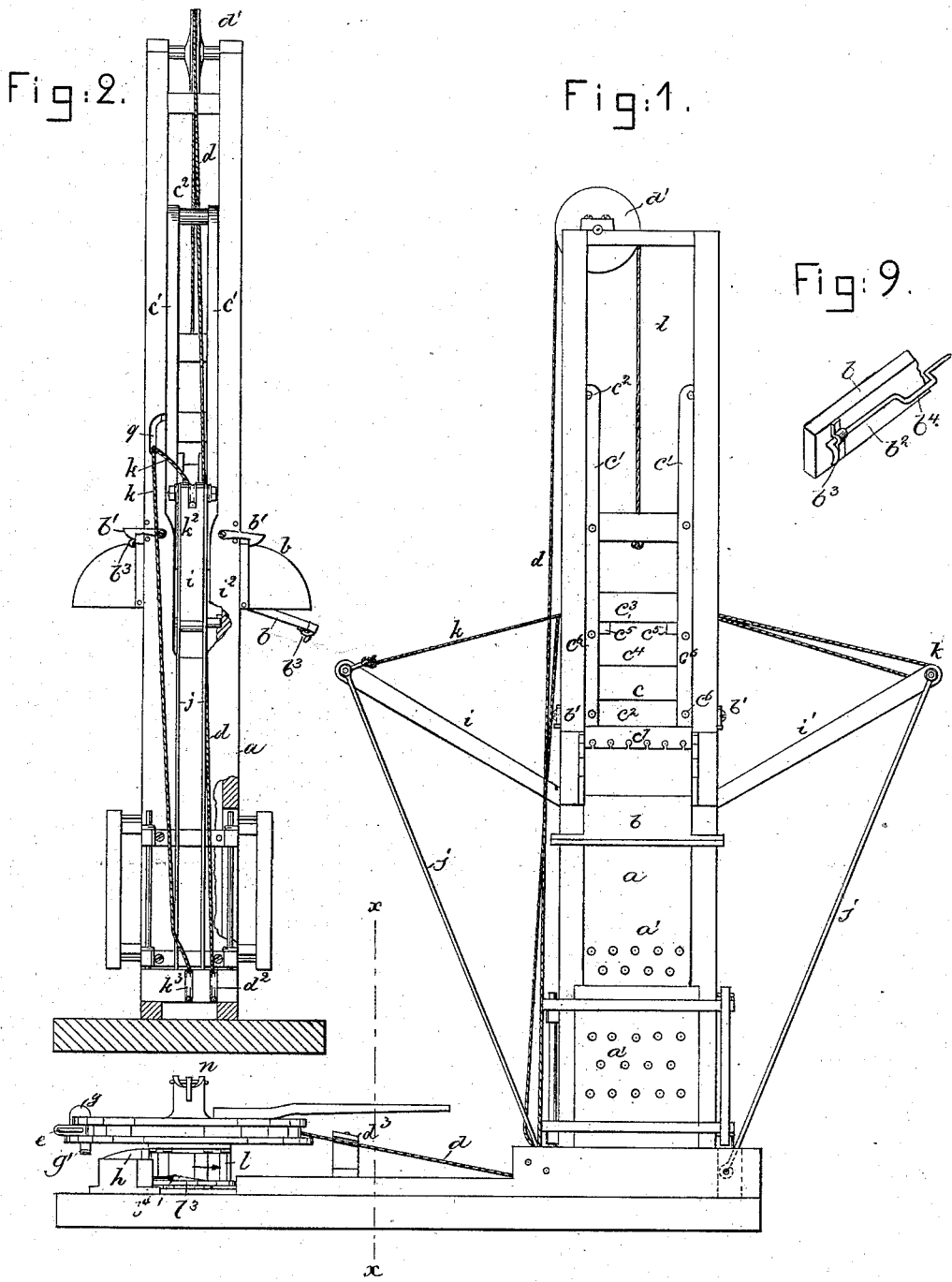

G. W. BATCHELDER.
BALING PRESS.

No. 251,990. Patented Jan. 3, 1882.

Witnesses.
W. H. Sigiston.
B. J. Noyes.

Inventor.
Greenleaf W. Batchelder
by Crosby & Gregory
Attys.

(No Model.) 3 Sheets—Sheet 3.

G. W. BATCHELDER.
BALING PRESS.

No. 251,990. Patented Jan. 3, 1882.

Witnesses.
W. H. Sigston.
B. J. Noyes.

Inventor.
Greenleaf W. Batchelder
by Crosby & Gregory
Attys.

UNITED STATES PATENT OFFICE.

GREENLEAF W. BATCHELDER, OF BOSTON, MASSACHUSETTS.

BALING-PRESS.

SPECIFICATION forming part of Letters Patent No. 251,990, dated January 3, 1882.

Application filed November 23, 1881. (No model.) Patented in Canada October 12, 1881.

*To all whom it may concern:*

Be it known that I, GREENLEAF W. BATCHELDER, of Boston, county of Suffolk, State of Massachusetts, have invented an Improvement in Baling-Presses, of which the following description, in connection with the accompanying drawings, is a specification.

This invention, relating to a baling-press such as employed for pressing hay, cotton, and similar material to form bales, is embodied in an apparatus in which the material to be pressed is fed into a tower and acted upon by a falling weight or beater to render the mass accumulating in the bottom of the tower compact, the said weight being carried up above the point at which the material is fed, and allowed to drop upon the said material until a sufficient quantity is accumulated to form the bale, after which the said weight or beater is used as a follower to compress the material thus accumulated to the size desired for the bale. The said weight or beater is operated by a capstan adapted to be actuated by horse-power; and the present invention consists partly in the construction of the capstan, by which the different operations are properly performed, and also in the combination, with the beater and its lifting-rope, of the capstan or winding drum properly connected therewith, and arranged to automatically produce the intermittent raising and dropping of the said beater during the continuous rotation of the said capstan. In order to increase the effect of the beater, and to thereby produce as compact a bale as possible, the lower portion of the tower in which the bale is formed is provided with numerous small perforations or openings to permit the air to escape as the beater falls, and thus prevent its cushioning effect, which has commonly greatly impaired the efficiency of the beater. This construction also permits the dust and other fine dirt to be driven out of the material being baled, thus thoroughly cleaning it.

The invention also consists in certain details of construction, to be hereinafter referred to.

Figure 4:
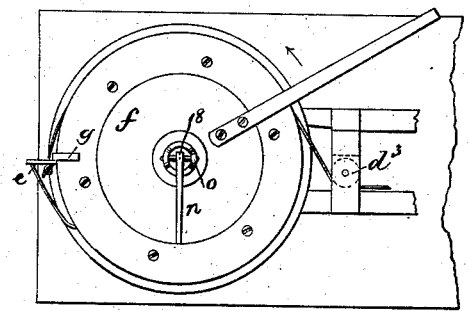
Figure 3:
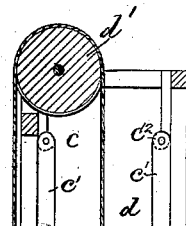
Figure 5:
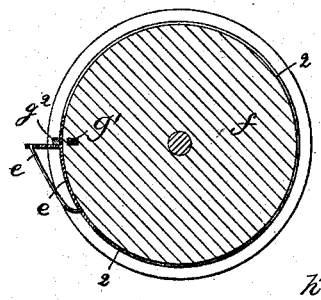
Figure 6:
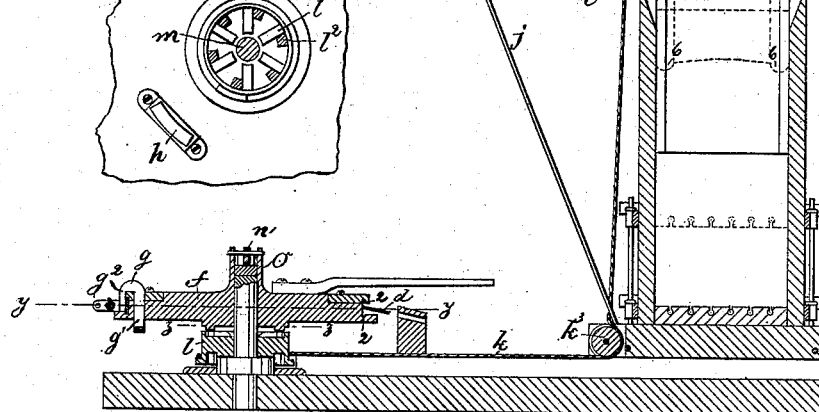
Figure 10:
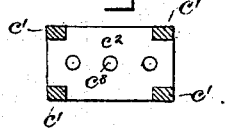
Figure 11:
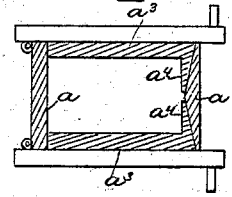
Figure 7:
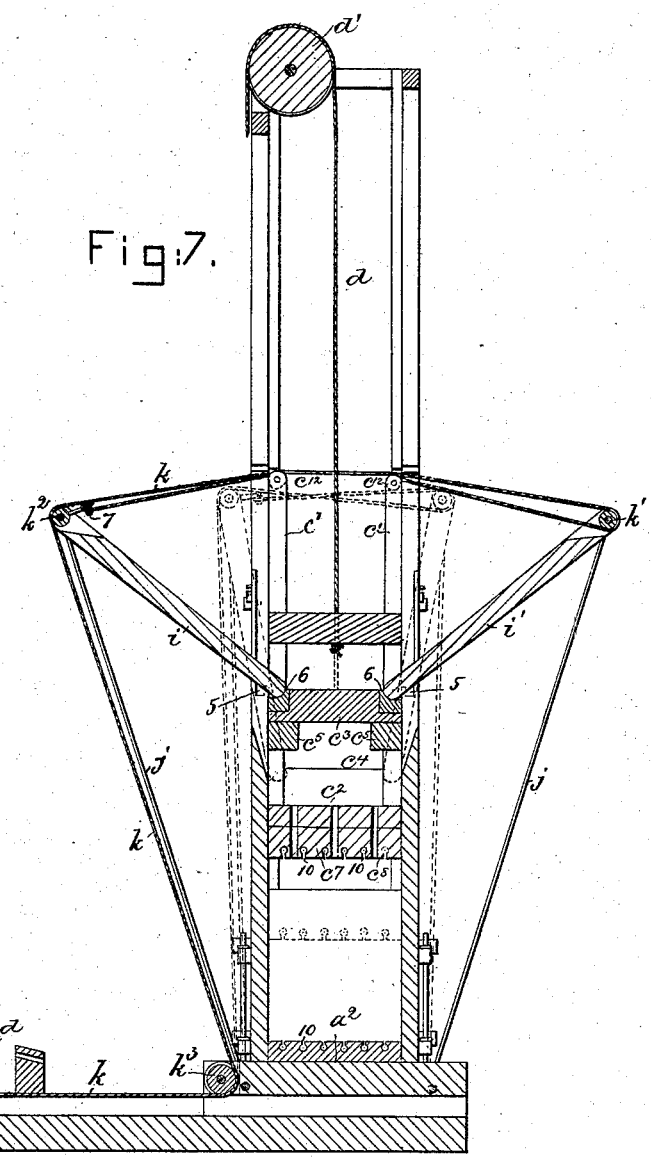
Figure 8:
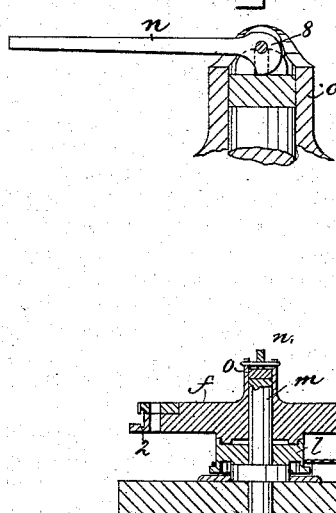

Figure 1 is a side elevation of a baling-press constructed in accordance with this invention; Fig. 2, an end elevation thereof, partly in section, on line $x\, x$, Fig. 1; Fig. 3, a vertical section of the apparatus, showing the weight in operation as a beater; Fig. 4, a plan view of the capstan; Fig. 5, a horizontal section thereof on line $y\, y$, Fig. 3; Fig. 6, a horizontal section thereof on line $z\, z$, Fig. 3; Fig. 7, a vertical section, showing the weight in operation as a follower; Fig. 8, a detail illustrating the shifting device by which the capstan is caused to operate the weight as a follower instead of as a beater; Fig. 9, a detail of the unfastening device for the feeding-doors; Fig. 10, a horizontal section of the beater on dotted line $x^2\, x^2$, Fig. 3; Fig. 11, a horizontal section of the lower portion of the tower in which the bale is formed.

The tower $a$, provided with feeding doors or openings $b$, for the introduction of the material to be pressed, may be of usual construction, the upper portion of the said tower serving as a guide for the weight or beater $c$, which fits the said tower and operates to beat and compress the material in the usual manner. The walls of the said tower are perforated, as shown at $a'$, or otherwise provided with openings, to permit the escape of air and dust, and thus cleanse the hay or other material to be formed into a bale and prevent the cushioning of the blow of the beater. The doors $b$ are held in place continuous with the walls of the tower by hooks $b'$, at each end of said door, and in order to enable both hooks to be unfastened simultaneously in order to open the door quickly as the beater rises, and enable the material to be introduced before it again falls, the unfastening devices $b^2$ are employed, consisting of a rod pivoted upon the doors $b$ and bent at its ends, as shown at $b^3$, to form cams, which engage and raise the said hooks $b'$ when the rod is rotated on its axis, it being bent or cranked, as shown at $b^4$, to form a handle by which it may be readily rotated for this purpose. While the material is being fed into the tower to form a bale the weight $c$ is intermittingly raised above the door $b$ to permit the material to be thrown in beneath it, and then dropped upon the said material to pack it in the lower portion of the tower $a$. This intermittent motion is accomplished by the following mechanism:

The lifting-rope $d$, passing over a pulley, $d'$, at the top of the tower, and other guide-pulleys, $d^2\, d^3$, at the base thereof, is attached to a shoe, $e$, fitted to slide freely in the guide 2 in the capstan-drum $f$, as clearly shown in Figs. 3, 4, and 5, so that the rope $d$ is loosely connected with the capstan-drum, which may be rotated in the direction of the arrow, Fig. 4, without affecting the said rope. When desired to raise the weight the said shoe $e$ is caused to rotate with the drum $f$ by the engaging device $g$, (shown as U-shaped,) it having a long arm, $g'$, adapted to pass through a socket in the drum $f$, and a shorter arm, $g^2$, to engage the shoe $e$, as best shown in Fig. 5. Thus when the engaging device $g$ is in its socket and the drum $f$ in rotating brings it about to the guide-pulley $d^3$, near which the shoe $e$ will remain held by the tension of the rope, it will engage the said shoe, causing it to move positively with the said drum and wind the rope thereon, as shown in Fig. 4, raising the weight $c$ above the doors $b$, to permit the material to be inserted beneath it. When the weight has been raised the desired height the long arm $g'$ of the engaging device $g$ is brought in contact with the releasing cam or incline $h$, (see Figs. 1 and 6,) fixed upon the bed-plate of the said capstan, and the engaging device is thus raised until its short arm $g^2$ passes over and disengages the shoe $e$, permitting the weight to fall, carrying the shoe back in its guide 2 to the position near the pulley $d^3$. By means of this engaging device and releasing-cam the intermittent rising and falling of the weight is kept up automatically as long as the capstan is rotated in the direction of the arrow, Fig. 4.

When the desired amount of material has been fed into the tower and properly compacted by the beating operation of the weight $c$ the engaging device $g$ is wholly removed from the capstan by the operator, thus leaving the rope $d$ loose and the weight $c$ resting on the material in the position shown in full lines, Fig. 7, ready to be pressed down upon the said material to reduce it to a proper size for a bale. This is accomplished by pressure-arms $i$ $i'$ and their toggle-jointed tie-rods $j$, as follows: The said pressure arms $i$ $i'$, which are provided with trunnions $i^2$, to be held by the sockets 5 while the beating operation is going on, are disengaged from the said sockets and placed in the recesses 6 at the top of the weight $c$. (See Figs. 3 and 7.) The rope $k$, which operates the pressure-arms, is attached at 7 to the arm $i$, then passes over the pulley $k'$ at the end of the arm $i'$, and thence over the pulley $k^2$ at the end of the arm $i$, from which it is carried under the guide-pulley $k^3$ at the base of the tower and attached to its winding-drum $l$, which is loose on the fixed shaft $m$ of the capstan $f$, which is also loose on the said shaft and located above the drum. The said drum $l$ is provided on its upper surface with teeth or projections $l'$, and the capstan $f$ is provided on its under surface with corresponding projections, $l^2$, operating as a clutch to engage and disengage the drums $f$ $l$ in the vertical movement of the former upon its shaft $m$. This vertical movement of the capstan-drum $f$ upon its shaft $m$ is accomplished by the cam-lever $n$, pivoted in the hub $o$ of the capstan-drum $f$ and engaging with its cam surface 8, (see Fig. 8,) the upper end of the shaft $m$, or a suitable bearing block or washer thereon. By this arrangement, when the cam-lever $n$ is in the position shown in Figs. 3 and 8 the capstan-drum $f$ is raised so that the projections $l^2$ on its under side are wholly disengaged from the projection $l'$ of the drum $l$, as shown in Fig. 3, and the rope $k$, that operates the presser-arms $i$ $i'$, is inoperative, the part traversing the tower being then held in notches 9, made to receive it, so as not to interfere with the beating movements of the weight $c$.

When the cam-lever $n$ is reversed from the position shown in Fig. 8 the capstan drum $f$ is dropped, as shown in Fig. 7, so as to engage, by the projections $l^2$ and $l'$, the drum $l$ to wind up the rope $k$ and operate the presser-arms $i$ $i'$ in the usual manner, drawing them from the position shown in full lines to that shown in dotted lines, Fig. 7.

The drum $l$ is provided with a grade or incline, $l^3$, which has the abrupt vertical shoulder $l^4$. In the rear of this shoulder a hole is made in the drum $l$, through which the rope $k$ is passed and held by a knot. As the drum rotates in the direction of the arrow, Fig. 1, this grade serves to guide the second turn of this rope on the drum and causes it to be properly laid above the first.

The weight $c$ is constructed of blocks of wood fitted and connected as follows: Four upright corner-posts, $c'$, extend upward from the main portion of the beater, and are provided with rollers $c^{12}$, (see Fig. 7,) to receive the portion of the rope $k$ between the ends of the presser-arms $i$ $i'$, so that in the first movement of the said presser-arms, before they have greatly approached the vertical position, the said rope $k$ will act upon the arms and weight $c$ to assist in pressing it downward. The posts $c'$ are braced by being arranged in the corners of the tower.

The main portion of the beater is composed of two thick blocks, $c^2$ $c^3$, one at the top and the other at the bottom, properly recessed at the corners to receive the uprights $c'$, with which they entirely fill and fit the tower, as shown in Fig. 10. The space between the said blocks $c^2$ $c^3$ at the front and back of the beater, as viewed in Fig. 1, is occupied by blocks $c^4$, recessed at their ends to receive the uprights or corner-posts $c'$, and at their top to receive a tenon of the cross-pieces $c^5$, which are fitted between the said blocks $c^4$ and corner-posts, as shown in Figs. 1 and 2. The whole beater, formed of pieces thus jointed, is fastened firmly together by a series of bolts, $c^6$, passing through the corner-posts $c'$ from front to back of the beater, and the acting face $c^7$ is fastened, as by screws, to the lower block, $c^2$, it being thus readily detachable, so that different faces may be employed, if desired, when the press is used for different materials. A series of holes, $c^8$, are made through the acting face $c^7$ and block $c^2$ to permit the air to pass through as the weight descends, and thus co-operate with the holes in the walls of the tower to prevent the trapping of air and cushioning of the beater thereon. A large open space is left in the beater, as shown in Figs. 2 and 3, in which iron or other heavy material may be placed if it is desired to add to the weight of the beater. The upper block, $c^3$, has recesses 6 at its ends to receive the ends of the presser-arms $i\ i'$, they being preferably made in iron bearing-blocks let into the said block $c^3$.

The bed-plate $a^2$, upon which the material is pressed at the bottom of the tower, and the acting face $c^7$ of the weight are provided with a series of holes, 10, through which the thongs or wires by which the material is to be bound together to form a bale may be passed around the said material after it has been pressed, the doors $a^3$ at the bottom of the tower being opened for this purpose in the usual manner. The said holes 10 are sufficiently large to enable the thongs to be readily inserted, and narrow channels are cut from them to the surface of the bed-plate and weight through which the said thongs when inserted may be drawn into contact with the material to be bound. The object of this construction is to present as small openings in the faces of the press-plates as possible. When the openings are large the bale is less compact and shapely, and it is more difficult to compress the hay into good marketable bales.

The bale, when pressed in the bottom of the tower, will be held forcibly therein by its friction, and in order to enable it to be readily removed through the doors $a^3$ after it has been bound together, the said doors are provided with end pieces, $a^4$, which, when the doors are closed, lie against the end wall of the tower, as shown in Fig. 11, and form the surface against which the bale is pressed. As soon as the doors are opened the space occupied by the end pieces, $a^4$, is left between the bale and the wall of the tower, so that the bale will no longer bind and may be easily forced out.

Instead of perforating the walls of the tower, the said walls may be made of slats with narrow spaces between them sufficient to permit the free escape of air, dust, &c., but properly confining the material of the bale; but whether perforations in otherwise solid walls or spaces between slotted walls be used as air-openings, it will be understood that I make no claim to the same other than in what is known as a "beater-press," wherein the weight or beater fits snugly in, or so as to fill the outline of the box, the operation of such a beater within the box being such that as it falls it meets and depresses a column of air, which, had it no vent, would burst the box; but at the same time the escape of this air must be so governed that the air in the box will be sufficient to cushion the beater more or less, for if the beater fell directly upon the hay without the intervening stratum of air it would break the hay and thrash out the seed, and thus practically defeat the object of my invention. It was only after many experiments and practical demonstrations that I was enabled to properly proportion these air-escapes.

I am aware that in other presses than the class herein designated "beater-presses" the press-box has been perforated or made with slots; but these openings let out the air entirely and at once, and the weight needs no cushioning.

I claim—

1. The drum $l$, provided with the grade or incline $l^3$, having the shoulder $l^4$, and combined with the rope $k$, secured to the drum at the rear of the shoulder $l^4$, whereby as the drum rotates said grade will so guide the second turn of the rope as to lay it above the first, as shown and described.

2. The capstan-shaft $m$ and capstan-drum $f$, mounted loose thereon, combined with a second winding-drum $l$, also loose on the said shaft, and arranged below the drum $f$, the drums being provided with clutch-projections $l'\ l^2$, to enable them to be engaged with or disengaged from one another, substantially as described.

3. In a beating-press for baling purposes, the combination, with the beater, of the tower having its walls perforated or provided with openings for the escape of air, dust, &c., to prevent the undue retardation or cushioning of the said beater thereby, and to cleanse the material of the bale, substantially as described.

4. The combination, with the tower, of the pressure-arms $i\ i'$ and their actuating rope and pulleys therefor, the beater having recesses to receive the said arms, and the four arms or posts extending upwardly from said beater in the corners of the tower, whereby they are braced, and provided with pulleys to receive the portions of the said actuating-rope that extend across between the pressure-arms, substantially as and for the purpose set forth.

5. The combination, with the tower and the beater and its operating levers and ropes, of the drum $l$, having the projections $l'$, the drum $f$, arranged above the drum $l$, and on the same shaft, and having the lugs $l^2$ and means, substantially as described, to engage and disengage the projections $l'\ l^2$ of the drums, as and for the purpose specified.

6. In a baling-press, the herein-described beater, consisting of the four corner-posts $c'$, the top and bottom blocks, $c^2\ c^3$, recessed to receive the said corner-posts, and the front and rear blocks, $c^4$, all united by bolts through the said corner-posts, and the detachable acting face $c^7$, all substantially as described.

7. The feeding-door $b$ and its fastening-hooks $b'\ b'$ at each end, combined with the unfastening device $b^2\ b^3\ b^4$, for simultaneously disengaging both the said hooks, substantially as described.

In testimony whereof I have signed my name to this specification in the presence of two subscribing witnesses.

GREENLEAF W. BATCHELDER.

Witnesses:
JOS. P. LIVERMORE,
B. J. NOYES.